No. 637,130. Patented Nov. 14, 1899.
H. KIRSCHNING.
PACKING FOR STUFFING BOXES.
(Application filed May 5, 1899.)
(No Model.) 3 Sheets—Sheet 1.

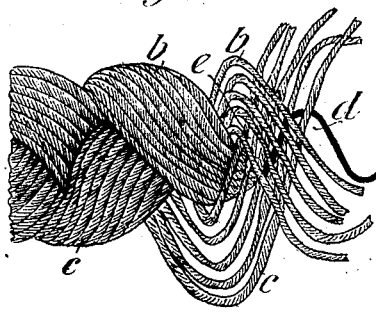
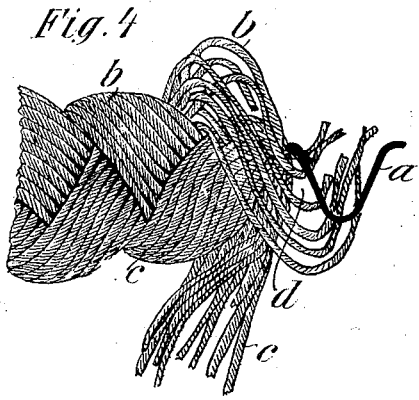
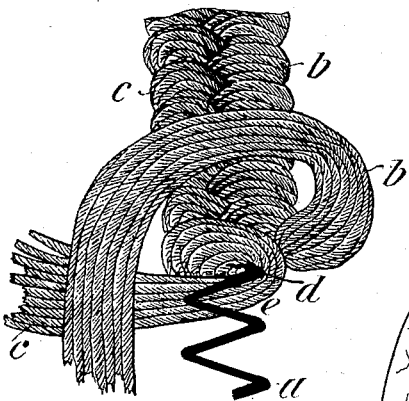
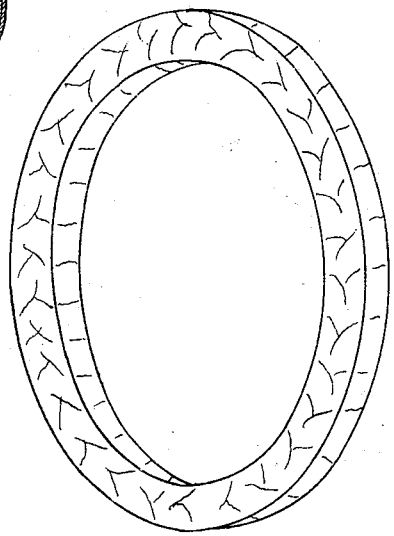

No. 637,130. Patented Nov. 14, 1899.
H. KIRSCHNING.
PACKING FOR STUFFING BOXES.
(Application filed May 5, 1899.)

(No Model.) 3 Sheets—Sheet 3.

Witnesses,

Inventor:
H. Kirschning
By
Attorneys

UNITED STATES PATENT OFFICE.

HERMANN KIRSCHNING, OF BERLIN, GERMANY.

PACKING FOR STUFFING-BOXES.

SPECIFICATION forming part of Letters Patent No. 637,130, dated November 14, 1899.

Application filed May 5, 1899. Serial No. 715,680. (No model.)

*To all whom it may concern:*

Be it known that I, HERMANN KIRSCHNING, a citizen of the German Empire, residing at Berlin, Germany, have invented certain new and useful Improvements in Packings for Stuffing-Boxes, Flanges, and the Like, of which the following is a specification.

My invention relates to improvements in packings of asbestos threads in the form of rings, ropes, or the like; and the objects of my improvements are, first, to attain simplicity in the mode of plaiting the asbestos threads by the help of a spiral or serpentine wire; second, to attain a great elasticity of the packing, and, third, to facilitate the forming of the packing in various shapes. I attain these objects in the manner illustrated in the accompanying drawings, in which—

Figure 1:
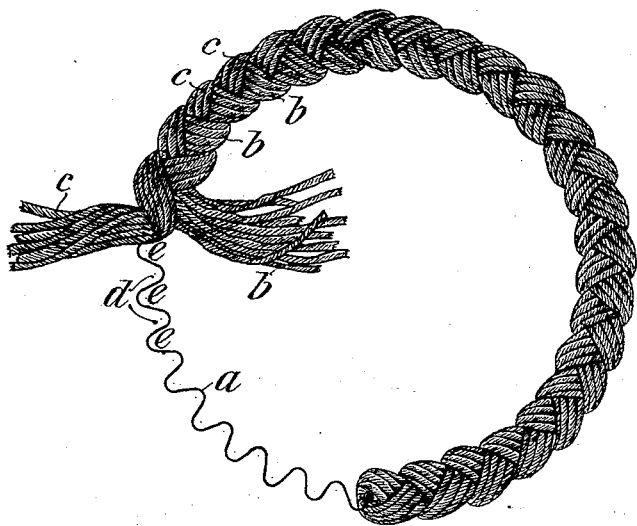
Figure 2:
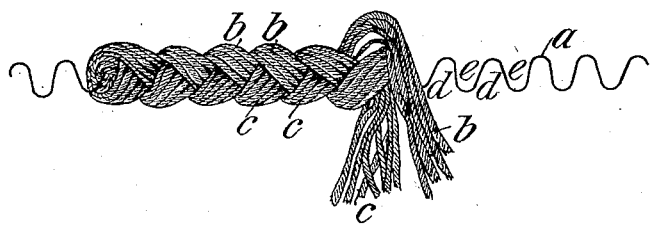
Figure 7:
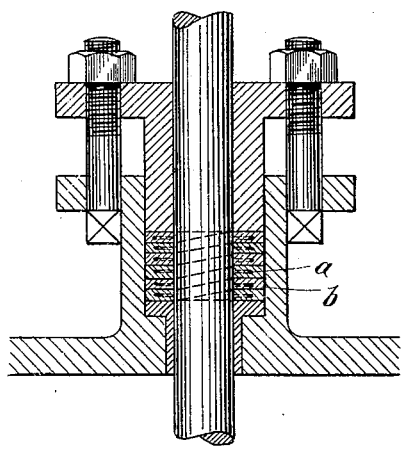
Figure 8:
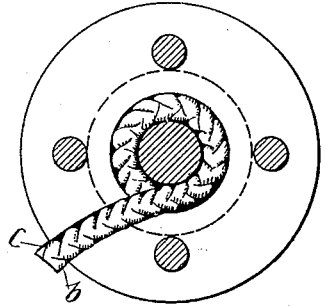
Figure 9:
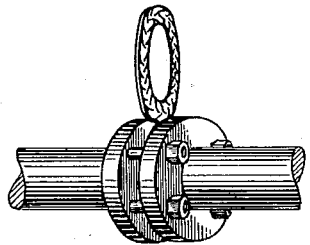

Figure 1 shows a packing-ring, and Fig. 2 shows a length of packing-rope. Figs. 3, 4, and 5 show short portions of a packing-ring drawn to a greater scale and in various positions for illustrating the manner of winding. Fig. 6 shows a packing-ring after compression, and Figs. 7, 8, and 9 show the application of these improved packing ropes and rings.

In manufacturing the packing I use a serpentine wire $a$, and I apply two bundles or groups of asbestos threads and twist them in opposite directions around the wire in such a manner as to cause the threads of the group $b$ to be always placed in the bend $d$ of the wire. In this manner the threads of the one group are always covered and retained by those of the other group. By this means a plaiting is produced having great firmness without interfering with the elasticity of the ring, rope, or strip, and covering the wire entirely.

Figs. 3 to 5 show clearly the manner of twisting the threads. The threads of the group $c$ are wound around the wire $a$, Fig. 3, and tightly lodged in the bend $e$, as shown in Fig. 4. Thereupon the group $b$ is similarly wound around the wire, as shown in Figs. 4 and 5, and tightened into the bend $d$. This alternate winding and twisting is continued until the ring, rope, or strip is completed.

The pressing of the ring into the form as shown in Fig. 6 may be effected in any convenient manner providing the shape and the cross-section thereof are suitable for the purpose for which it is required. Before and after the pressing of the rings they may be impregnated with a solution of caoutchouc or rubber, so as to render them thoroughly impervious to steam and liquids, the elasticity remaining unaffected.

For stuffing-boxes the packing-rope is used in the manner shown in Figs. 7 and 8, when the high elasticity is an especial advantage. The rope is applied spirally around the rod, so that the windings lie flat against one another. In this manner a packing for stuffing-boxes is obtained which is of great reliability and durability.

The advantage accruing from the resiliency or yielding of the packing-ring will be clear from Fig. 9. Ordinarily in order to insert or remove the packing-ring in flanged tubes the bolts have to be taken out entirely, while with this improved packing they only need be loosened. The packing-ring is pressed into an oval shape, and after being placed between the bolts its natural resiliency causes it to resume its circular shape. This manner of introducing the packing and the consequent shortening of the interruption in the service thereby is of great importance.

The improved arrangement of my packing as compared with packing having a metallic core has great advantages. The wire imparts to the packing ring or strip its form and solidity, together with great elasticity, whereby the wire is enabled to freely expand and contract, while the packing may be bent or compressed in any direction. The above-mentioned method of twisting provides a strong support for the asbestos threads onto the wire and so obviates the tearing or bursting of the packing through great pressure. As the wire core is covered on all sides by the asbestos threads, the packing material is capable of adapting itself to any surface and especially for use in stuffing-boxes, when it presses both on the walls of the stuffing-box and on the piston-rod or the like, and thus forms a tight packing without damaging the piston-rod or the like. Another important point is that the packing resists the action of steam, acid, and alkali. The rings or strips can be manufactured in any desired size or thickness, and it is a consideration that the same by merely pressing them may be formed with a circular, oval, or square or other section, so as to suit the particular purpose for which they are to be employed.

What I claim as my invention, and desire to secure by Letters Patent, is—

1. A packing, comprising a resilient metal serpentine core and two groups or threads wound on the core in opposite directions, the said two groups of threads being alternately seated in opposite recesses of the core, substantially as specified.

2. A packing, comprising a resilient metal serpentine core, and two groups of threads wound on the core in opposite directions, the said two groups of threads being alternately seated in opposite recesses of the core, the material being impregnated with a waterproof solution, substantially as specified.

HERMANN KIRSCHNING.

Witnesses:
HENRY HASPER,
WALDEMAR HAUPT.